(12) United States Patent
Serafin et al.

(10) Patent No.: US 11,544,899 B2
(45) Date of Patent: Jan. 3, 2023

(54) SYSTEM AND METHOD FOR GENERATING TERRAIN MAPS

(71) Applicant: TOYOTA RESEARCH INSTITUTE, INC., Los Altos, CA (US)

(72) Inventors: Jacopo Serafin, Ann Arbor, MI (US); Matthew Derry, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/653,730

(22) Filed: Oct. 15, 2019

(65) Prior Publication Data
US 2021/0110600 A1 Apr. 15, 2021

(51) Int. Cl.
*G06T 17/05* (2011.01)
*G06T 5/00* (2006.01)
*G06T 5/20* (2006.01)

(52) U.S. Cl.
CPC .............. *G06T 17/05* (2013.01); *G06T 5/002* (2013.01); *G06T 5/20* (2013.01); *G06T 2207/10028* (2013.01); *G06T 2207/20221* (2013.01); *G06T 2215/12* (2013.01)

(58) Field of Classification Search
CPC ........... G06T 17/05; G06T 5/002; G06T 5/20; G06T 2207/10028; G06T 2207/20221; G06T 2215/12; G01C 21/3626–3697
See application file for complete search history.

(56) References Cited

U.S. PATENT DOCUMENTS

| | | | |
|---|---|---|---|
| 8,019,736 B1* | 9/2011 | Postnikov | G06T 17/05 707/693 |
| 9,524,647 B2 | 12/2016 | Kohn-Rich | |
| 2010/0264629 A1* | 10/2010 | Gandhi | B60R 21/203 280/728.2 |
| 2012/0053755 A1* | 3/2012 | Takagi | B60W 40/04 701/1 |
| 2015/0036487 A1* | 2/2015 | Sakata | H04W 28/0289 370/229 |
| 2015/0268058 A1* | 9/2015 | Samarasekera | G08G 5/0073 701/409 |
| 2015/0344028 A1 | 12/2015 | Gieseke et al. | |
| 2016/0221592 A1* | 8/2016 | Puttagunta | B61L 25/04 |
| 2016/0292626 A1* | 10/2016 | Green | G06Q 50/02 |
| 2017/0032509 A1* | 2/2017 | Mannar | G06T 7/73 |
| 2017/0169605 A1* | 6/2017 | Salomonsson | G06T 7/55 |

(Continued)

OTHER PUBLICATIONS

Miller, Thomas Isaac, "Robotic Localization and Perception in Static Terrain and Dynamic Urban Environments," Jan. 2009, Cornell University.

*Primary Examiner* — Daniel F Hajnik
(74) *Attorney, Agent, or Firm* — Seyfarth Shaw LLP (57) ABSTRACT

Fusing online and mapped terrain estimates by using weighted grid cells that scales the values returned from online terrain and mapped terrain is disclosed. Previously mapped terrain data and online terrain data are fused and a grid having cells of a predetermined size is overlaid on the terrain map. Each cell may include terrain data based on weighted mapped terrain data and weighted online terrain data, where the weighting values for the mapped terrain data and for the online terrain data may be different. A fused terrain estimate may be a result of a weighted mean for each cell smoothed to reduce noise.

20 Claims, 5 Drawing Sheets

(56) References Cited

U.S. PATENT DOCUMENTS

| | | | |
|---|---|---|---|
| 2017/0345321 A1 | 11/2017 | Cross et al. | |
| 2018/0004210 A1* | 1/2018 | Iagnemma | G08G 1/096775 |
| 2018/0025234 A1* | 1/2018 | Myers | G06V 10/82 |
| | | | 348/148 |
| 2018/0122135 A1 | 5/2018 | Gain et al. | |
| 2019/0236763 A1* | 8/2019 | Chan | A61B 6/5235 |
| 2019/0244517 A1* | 8/2019 | Moustafa | G08G 1/0112 |
| 2020/0003897 A1* | 1/2020 | Shroff | G01S 17/86 |
| 2020/0134783 A1* | 4/2020 | Mori | H04N 5/222 |
| 2020/0271787 A1* | 8/2020 | You | G01S 17/89 |
| 2021/0131823 A1* | 5/2021 | Giorgio | G01S 17/86 |

\* cited by examiner

SYSTEM AND METHOD FOR GENERATING TERRAIN MAPS

FIELD OF TECHNOLOGY

The present disclosure relates to a system and method of generating terrain maps, more specifically to generating maps surrounding an ego vehicle by fusing locally mapped terrain data with online data.

BACKGROUND

Autonomous agents (e.g., vehicles, robots, drones, etc.) and semi-autonomous agents use machine vision for analyzing a surrounding environment. Machine vision is distinct from the field of digital image processing due to the desire to recover a three-dimensional (3D) structure of the world from images and using the 3D structure for fully understanding a scene. That is, machine vision strives to provide a 3D map of the environment that surrounds an autonomous agent.

In operation, autonomous agents may rely on trained neural networks, such as a convolutional neural network (CNN), to identify objects (e.g., pedestrians, cyclists, other cars, etc.) within areas of interest in an image of a surrounding environment. For example, a CNN may be trained to identify objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent.

Autonomous and semi-autonomous vehicles rely on continuous mapping of an environment to assist in navigating through that environment. Traditionally, there are two methods of computing terrain maps around an ego vehicle. One method includes mapped terrain data, which may be obtained by extracting relevant data from a map produced by a method such as Simultaneous Localization and Mapping (SLAM). However, this form of mapped terrain data is static, computed a priori, and may not be up-to-date.

A second method of computing terrain maps may include computing online terrain data based on a point cloud data produced by sensors on the ego vehicle. Online terrain data may be computed live and reflects the environment around the ego vehicle. The range of online terrain data, however, is limited by the range of the sensors. For example, the sensor range of many known autonomous or semi-autonomous vehicles may be limited to about 70 meters, and performance may degrade as the range increases. Thus, at 70 meters and beyond, the quality of the terrain data may be at its worse.

SUMMARY

Aspects of the present disclosure provide systems and methods of combining mapped terrain data and online terrain data to overcome the respective limitations of each. Aspects of the present disclosure provide for fusing online and mapped terrain estimates by using weighted grid cells that scale the values returned from online terrain and mapped terrain (and perhaps unknown space as well).

According to one aspect of the present disclosure, a method of generating a terrain map is disclosed. According to the method, a first set of map data may be retrieved from a memory. A second set of map data may be retrieved from at least one sensor. A terrain map may be generated from the first and second sets of map data. A grid overlaying the terrain map may be generated. The grid may include a plurality of cells. Each of the plurality of cells may be weighted with a first weight corresponding to the first set of map data and a second weight corresponding to the second set of map data. For each of the plurality of cells, a combined value from the first and second weight may be generated and a fused terrain map reflecting the combined value is also generated.

According to another aspect, a map generation device is disclosed. The device may include a memory storing a first set of map data, a sensor configured to obtain a second set of map data; and a map generating module. The map generating module may be configured to generate a terrain map from the first and second sets of map data. A grid may be applied overlaying the terrain map. The grid may comprise a plurality of cells. Each of the plurality of cells may be weighted with a first weight corresponding to the first set of map data and a second weight corresponding to the second set of map data. For each of the plurality of cells, a combined value may be generated from the first and second weight. A fused terrain map may be generated reflecting the combined value.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Autonomous agents (e.g., vehicles, robots, drones, etc.) and semi-autonomous agents may use scene-understanding models, such as a trained artificial neural network, to identify objects and/or areas of interest in an image. Additionally, autonomous agents may predict a path (e.g., trajectory) of one or more detected objects. The predicted trajectory may be used for collision avoidance, route planning, and/or other tasks.

According to one aspect of the present disclosure, trajectory prediction models may predict an object's trajectory based on a 2D or 3D map generated from a fusion of mapped terrain data with live sensory, or online, terrain data. Online terrain data may include data from one or more sensors, such as a light detection and ranging (LIDAR) sensor, associated with a machine vision system. As described herein, data from the already-existing mapped terrain may be combined with the online terrain data. Weighted values of mapped terrain data may be combined with online terrain data to generate a fused terrain map of the environment and localize each object in the map.

Figure 1:
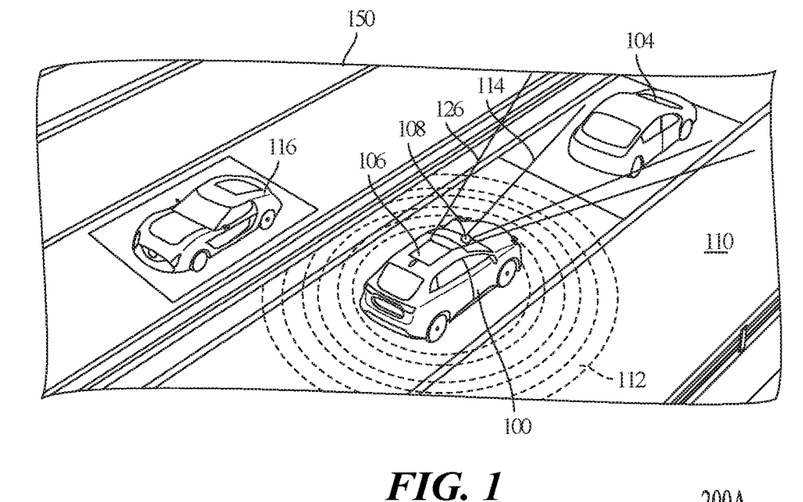
FIG. 1 illustrates an example of an agent in an environment according to aspects of the present disclosure.

FIG. 1 illustrates an example of an agent 100 in an environment 150 according to aspects of the present disclosure. As shown in FIG. 1, the agent 100 may be traveling on a road 110. A first vehicle 104 may be ahead of the agent 100 and a second vehicle 116 may be adjacent to the agent 100. In this example, the agent 100 may include a 2D camera 108, such as a 2D RGB camera, and a LIDAR sensor 106. Other sensors, such as RADAR and/or ultrasound, are also contemplated. Additionally, or alternatively, the agent 100 may include one or more additional 2D cameras and/or LIDAR sensors. For example, the additional sensors may be side facing and/or rear facing sensors.

According to one aspect, the agent 100 may operate in the environment 150 according to mapped data retrieved or obtained from at least two sources, including a previously generated terrain map, and online sensory data retrieved in substantially real-time. Generated terrain maps may be previously generated using SLAM, from which relevant objects and other data may be extracted and used to aid the trajectory of the agent 100. The SLAM data may feature static objects such as the road 110, other roadways, buildings, traffic lights and other objects that are not likely to move or change over time.

The environment 150 surrounding the agent 100 may include dynamic objects and static objects. A dynamic object refers to an object that may move, such as a pedestrian, bicycle, or car. A static object refers to background objects, such as a road, a sidewalk, or vegetation. Previously mapped terrain data may have, a priori identified and classified the static objects, while dynamic objects may be imaged and classified by online and on-board systems.

Online sensory data may include data retrieved or obtained from the 2D camera 108 capturing a 2D image 120 that includes objects in the 2D camera's 108 field of view 114. Additionally, the LIDAR sensor 106 may generate one or more output streams. The first output stream may include a 3D cloud point of objects in a first field of view, such as a 360° field of view 112 (e.g., bird's eye view). The second output stream 126 may include a 3D cloud point of objects in a second field of view, such as a forward-facing field of view.

In the exemplary environment 150 of FIG. 1, the 2D image captured by the 2D camera may include a 2D image of the first vehicle 104, as the first vehicle 104 is in the 2D camera's 108 field of view 114. A semantic segmentation system of the agent 100 may extract features from objects in the 2D image. For example, an artificial neural network, such as a convolutional neural network, may extract features of the first vehicle 104. The extracted features may be used to generate a semantic label for the first vehicle 104 to be included in the fused terrain map.

As is known to those of skill in the art, a LIDAR sensor uses laser light to sense the shape, size, and position of objects in an environment. The LIDAR sensor may scan the environment vertically and horizontally. In the current example, the artificial neural network of the agent 100 may extract height and/or depth features from the first output stream. The artificial neural network of the agent 100 may also extract height and/or depth features from the second output stream. The extracted features may be used to generate semantic labels of other objects in the environment 150.

Figure 2A:
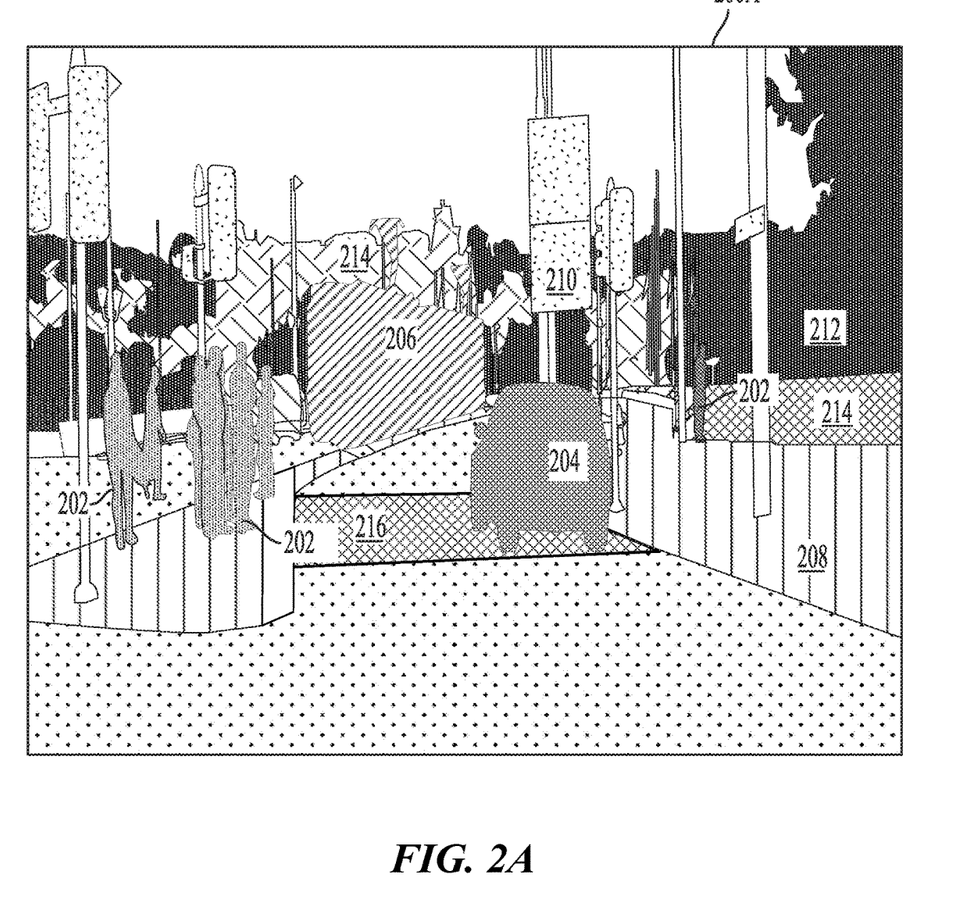
FIG. 2A illustrates a fused terrain map according to aspects of the present disclosure.
Figure 2B:
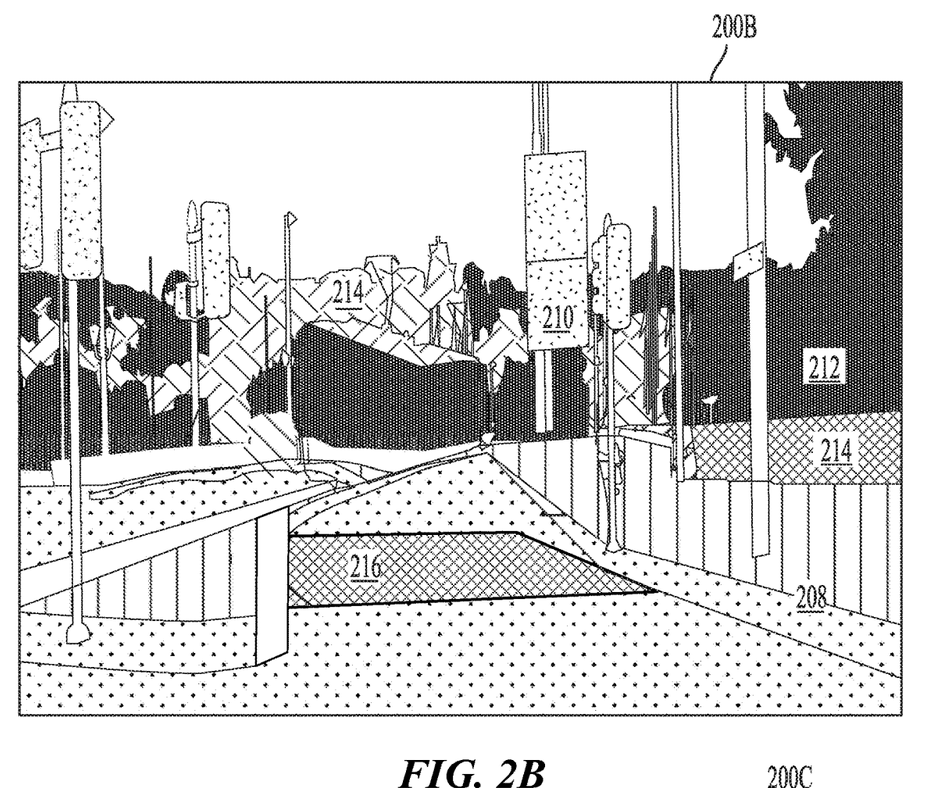
FIG. 2B illustrates a mapped terrain map according to aspects of the present disclosure.
Figure 2C:
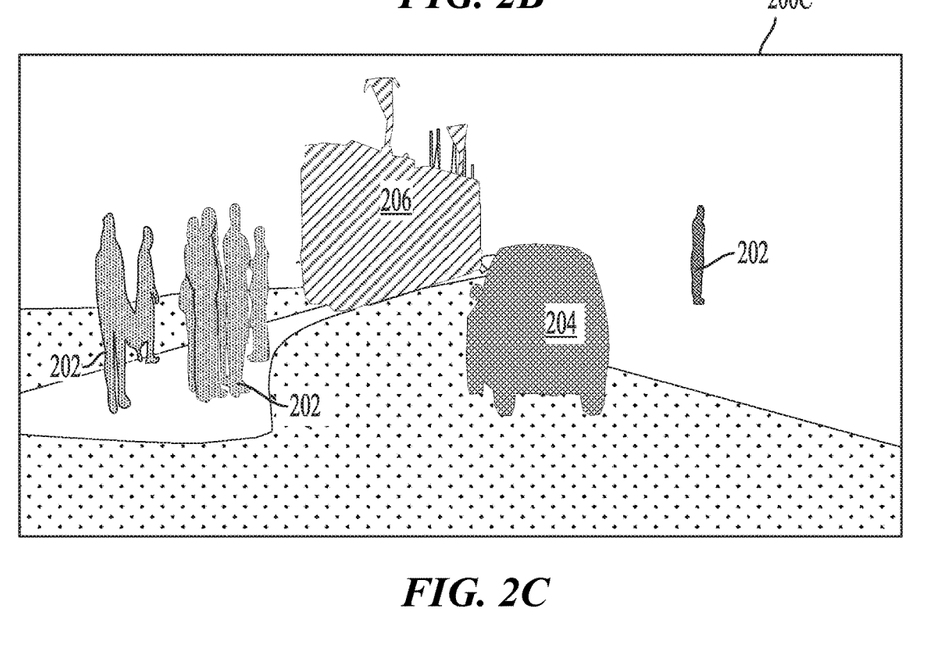
FIG. 2C illustrates an online terrain map according to aspects of the present disclosure.

FIG. 2A illustrates an example of a fused terrain map for use in generating an agent's trajectory according to aspects of the present disclosure. The terrain map may include a fusion of mapped data from a previously generated map and online data retrieved from the agent's onboard systems. FIG. 2B illustrates a previously generated terrain map 200B. FIG. 2C illustrates an exemplary online terrain map 200C. In the exemplary terrain map of FIG. 2A, objects such as sidewalks 208, street signs 210, vegetation 212, buildings 214 (e.g., structures), and crosswalks 216 may have been previously imaged, classified and mapped into the stored terrain map 200B as illustrated by the map of FIG. 2B. Objects such as pedestrians 202, cars 204, and a train 206, may be imaged, classified, and mapped into a substantially real-time, or online map 200C using the agent's on-board systems, as illustrated by the map of FIG. 2C. Aspects of the present disclosure are not limited to imaging and mapping the explicitly named elements. Other elements, both static and dynamic, may be imaged and classified. For simplicity, some labels of environmental objects are omitted. Further, while the online map 200C illustrated herein depicts the identification of dynamic objects, such as pedestrians and vehicles, it will be appreciated that the on-board, online imaging systems may also image classify and otherwise make use of static objects in conjunction with data included in the previously stored terrain map 200B.

Figure 2D:
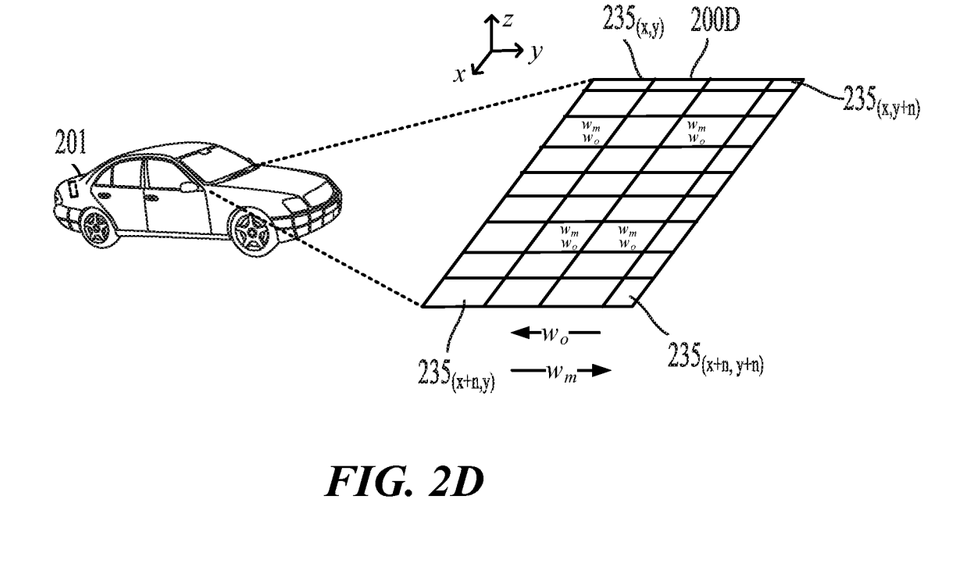
FIG. 2D illustrates a weighted fusion of mapped and online terrain map data according to aspects of the present disclosure.

FIG. 2D illustrates a conceptual fusion of stored terrain maps and online terrain maps according to one aspect of the disclosure. An agent, 201, such as an autonomous or semi-autonomous vehicle, may use a fused map 200D to form a trajectory through an environment. The fused terrain map 200D may include a two-dimensional (x,y) view of the environment surrounding the agent 201. For simplicity of illustration the fused map 200D illustrated in FIG. 2D represents the field-of-view in front of the agent 201, mapped to an (x,y) coordinate system that may be conceptualized as laying flat in front of the agent 201. One skilled in the art will appreciate that the fused map of the surrounding environment may take the form of different fields-of-view, coordinate systems and dimensions, including three dimensions, without deviating from the scope of the disclosure.

According to one aspect, the environment may be mapped as disclosed herein using both data from a previously stored terrain map as well as online terrain data generated by the agent's on-board systems. A map generator module, as described herein, may overlay the terrain map 200D with a grid 230 including cells 235 having predetermined sizes. As depicted in the exemplary grid 230, the terrain map 200D may be divided into a two-dimensional grid of $n^2$ cells. The height value, z, may be estimated in each cell. According to one aspect, each cell 235 of the grid 230 may include weighted height values for the mapped terrain data, $w_m$, and online terrain data, $w_o$.

According to one aspect, the weight values of the mapped terrain data, $w_m$, may be based on a number of environmental factors. Mapped terrain weights, for example, may be affected by factors like the range, the age of the terrain map (older maps given lower weights), the number of samples in that specific cell, and the like. When including a ranging factor, weights may be lower near the agent 201 and increase in value as the cells 235 increase in distance away from the agent 201. For example, as illustrated in FIG. 2D, the weighted values of $w_m$ may increase for cells 235 as the distance increases away from the agent.

According to one aspect, the weight values of the online terrain data, $w_o$, may be affected by factors including the range, the number of samples in that specific cell, how many different sensor modalities produced measurements in a particular cell, the strength of the measurement signal in the cell, semantic labels, ego car localization uncertainty, and the like. When including a ranging factor, the terrain data, $w_o$ may be at its highest in cells nearest to the agent 201, and decreasing as the cells increase in distance from the agent 201 (e.g., in the z-axis of the grid 230).

According to one aspect of the disclosure, the weighting values of the cells 235 may sum to one, i.e., $w_m+w_o=1$, however such a normalization is not required. Further, the terrain data for each cell may be computed as a combined value of the mapped terrain data $w_m$, and the online terrain data $w_o$. According to one aspect, the combined value may include a weighted mean of the mapped terrain data $w_m$ and the online terrain data $w_o$. The weighted mean for each cell may be smoothed to reduce noise, for example using a Gaussian kernel. The result is a fused terrain map that takes advantage of previously obtained terrain data supplemented with live, online terrain data. The resulting fused terrain map may form a comprehensive terrain map for the agent's use in generating a trajectory or other environmental navigation function.

Figure 3:
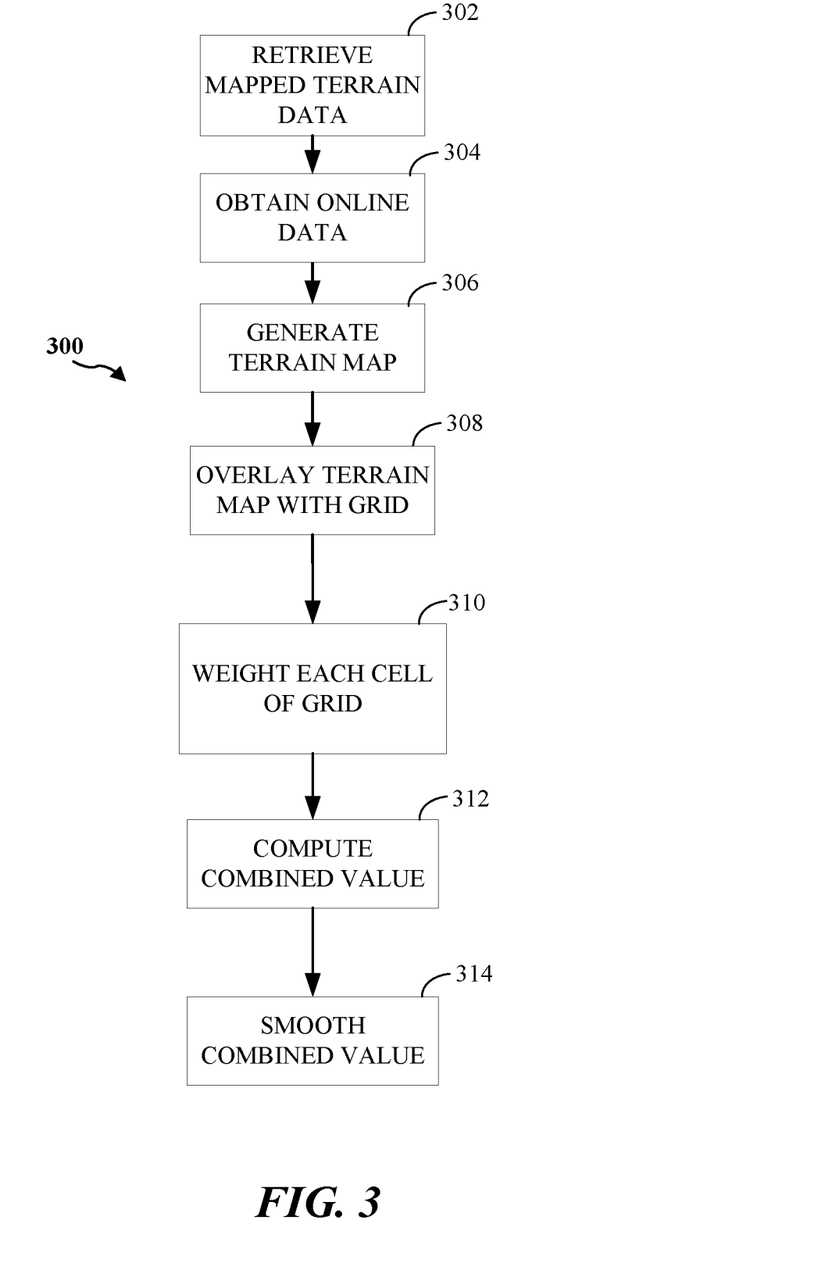
FIG. 3 depicts a method of generating a map according to one aspect of the present disclosure

Turning now to FIG. 3, a method 300 of generating a terrain map is depicted. As shown in block 302, a map generation system may retrieve mapped terrain data from a data source. The system may retrieve or obtain the mapped terrain data by extracting relevant data from a map produced by SLAM. One skilled in the art will appreciate that the mapped terrain data may be generated by other methods known in the art.

As shown in block 304, the map generating system may obtain online terrain data. As described herein, online terrain data may be retrieved or obtained from an agent's on-board systems, including, without limitations, RADAR, LIDAR, sensors, cameras and other data collection devices. Online terrain data may be computed and/or generated on a point cloud produced by the on-board systems.

According to one aspect of the disclosure, as shown in block 306, the map generating system may combine the mapped terrain data with the online terrain data to form a fused terrain map. The map generating system may, as shown in block 308, overlay the terrain map with a grid having cells of a predetermined size. Each cell of the grid may include terrain data retrieved from the mapped terrain as well as online terrain data obtained from the on-board agent's sensors.

As shown in block 310, the data of each cell of the grid may be weighted. According to one aspect, the mapped terrain data and the online terrain data may have different weighted values. According to one aspect, the weighting value for the mapped terrain data may be lower for cells near the ego vehicle and increasingly higher for cells as the cells increase in distance away from the ego vehicle. Conversely, the weighting value for the online terrain data may be higher for cells near the ego vehicle and decreasingly lower for cells as the cells increase in distance from the ego vehicle. According to one aspect of the present disclosure, the weighting values may be normalized such that the sum of the weighing values being equal to 1, but such normalization is not required.

As shown in block 312, the map generating system may compute a combined value for each cell. According to one aspect, the combined value may include a weighted mean of the mapped terrain data and the online terrain data. According to one aspect, a resulting height, z, for each cell of terrain may be computed by the following:

$$z=(w_o*z_o+w_m*z_m)/(w_o+w_m) \quad \text{(Eq. 1)}$$

where $z_m$ and $z_o$ represent respectively the height estimates for mapped and online terrain; $w_o$ and $w_m$ represent the weighting factors that may be scaled between 0 and 1, but need not be, and can depend on multiple factors such as range, the cell quantity of information, and other information sources such as localization uncertainty. For example, the weight value $w_o$ might decrease as the range from the ego vehicle increases since the sensor data gets sparser and more scattered the further an object is from the agent's sensors.

As shown in block 314, the map generating system may smooth the combined value for each cell to reduce noise and form an estimated fused terrain map. According to one aspect of the disclosure, the map generating system may smooth each cell with a Gaussian kernel, however other smoothing functions may also be applied.

Figure 4:
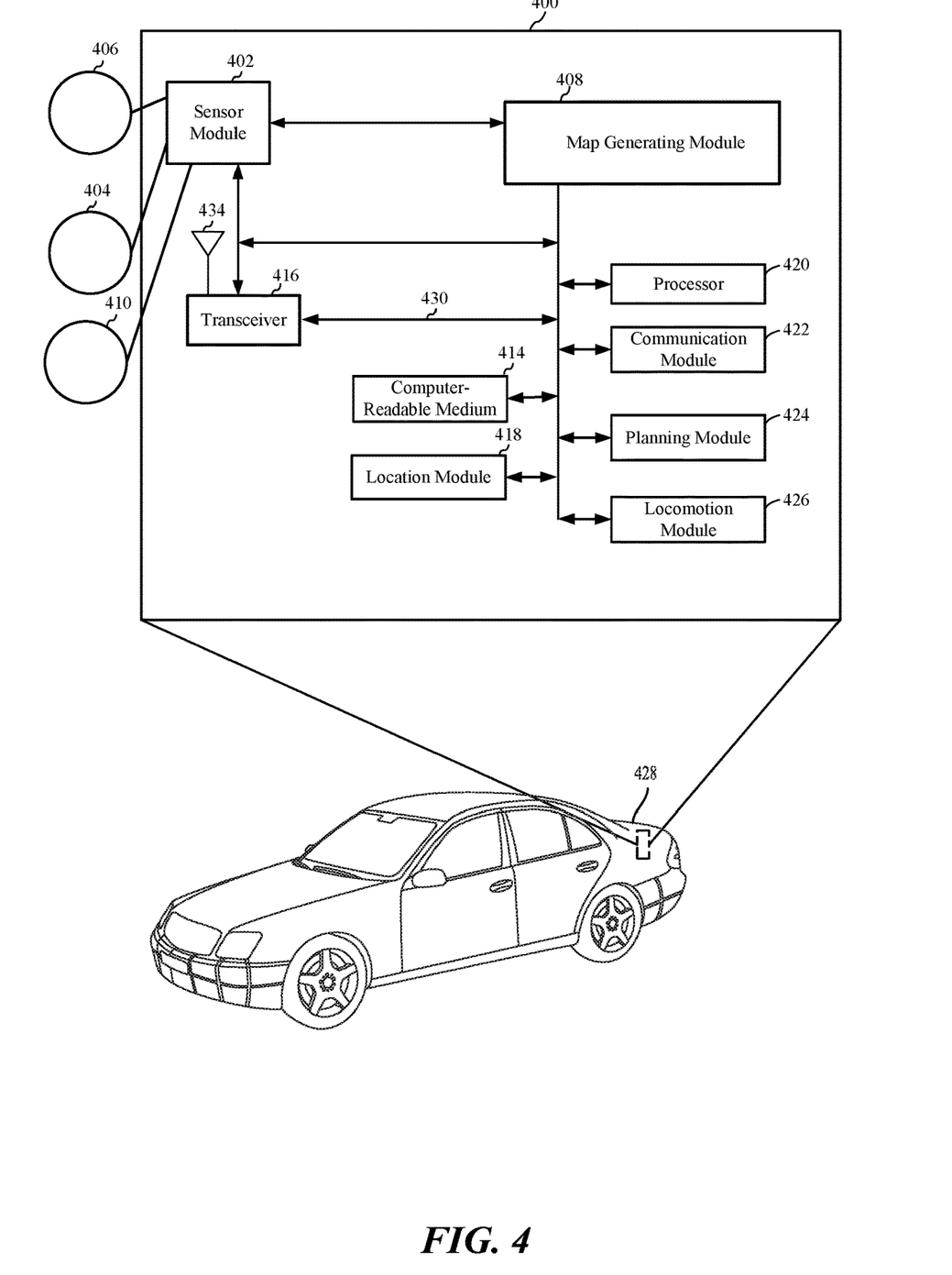
FIG. 4 depicts a hardware implementation for a map generating system according to aspects of the present disclosure.

FIG. 4 is a diagram illustrating an example of a hardware implementation for a map generating system 400, according to aspects of the present disclosure. The map generating system 400 may be a component of a vehicle, a robotic device, or other device. For example, as shown in FIG. 4, the map generating system 400 may be a component of a car 428. Aspects of the present disclosure are not limited to the map generating system 400 being a component of the car 428, as other devices, such as a bus, boat, drone, simulator, or robot, are also contemplated for using the map generating system 400. The car 428 may be autonomous or semi-autonomous.

The map generating system 400 may be implemented with a bus architecture, represented generally by a bus 430. The bus 430 may include any number of interconnecting buses and bridges depending on the specific application of the map generating system 400 and the overall design constraints. The bus 430 may link together various circuits including one or more processors and/or hardware modules, represented by a processor 420, a communication module 422, a location module 418, a sensor module 402, a locomotion module 426, a planning module 424, and a computer-readable medium 414. The bus 430 may also link various other circuits such as timing sources, peripherals, voltage regulators, and power management circuits, which are well known in the art, and therefore, will not be described any further.

The map generating system 400 may include a transceiver 416 coupled to the processor 420, the sensor module 402, a map generating module 408, the communication module 422, the location module 418, the locomotion module 426, the planning module 424, and the computer-readable medium 414. The transceiver 416 is coupled to an antenna 434. The transceiver 416 communicates with various other devices over a transmission medium. For example, the transceiver 416 may receive commands via transmissions from a user or a remote device. As another example, the transceiver 416 may transmit driving statistics and information from the map generating module 408 to a server (not shown).

The map generating module 408 may include the processor 420 coupled to the computer-readable medium 414. The processor 420 may perform processing, including the execution of software stored on the computer-readable medium 414 providing functionality according to the disclosure. The software, when executed by the processor 420, causes the map generating system 400 to perform the various functions described for a particular device, such as the car 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406, a second sensor 404, and a third sensor 410. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. The third sensor 410 may include an in-cabin camera for capturing raw video or images of the interior environment of the car 428. Of course, aspects of the present disclosure are not limited to the aforementioned sensors as other types of sensors, such as, for example, thermal, sonar, and/or lasers are also contemplated for either of the sensors 404, 406. The measurements of the sensors 404, 406, 410, 406 may be processed by one or more of the processor 420, the sensor module 402, the map generating module 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The sensors 404, 406, 410 may be coupled to the car 428 or may be in communication with the car 428.

The location module 418 may be used to determine a location of the car 428. For example, the location module 418 may use a global positioning system (GPS) to determine the location of the car 428. The communication module 422 may be used to facilitate communications via the transceiver 416. For example, the communication module 422 may be configured to provide communication capabilities via different wireless protocols, such as WiFi, long-term evolution (LTE), 3G, etc. The communication module 422 may also be used to communicate with other components of the car 428 that are not modules of the map generating module 408.

The locomotion module 426 may be used to facilitate locomotion of the car 428. As an example, the locomotion module 426 may control movement of the wheels. As another example, the locomotion module 426 may be in communication with a power source of the car 428, such as an engine or batteries. Of course, aspects of the present disclosure are not limited to providing locomotion via wheels and are contemplated for other types of components for providing locomotion, such as propellers, treads, fins, and/or jet engines.

The map generating system 400 may also include the planning module 424 for planning a predicted route or trajectory or controlling the locomotion of the car 428, via the locomotion module 426. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The map generating module 408 may be in communication with the sensor module 402, the transceiver 416, the processor 420, the communication module 422, the location module 418, the locomotion module 426, the planning module 424, and the computer-readable medium 414. In one configuration, the map generating module 408 may receive sensor data from the sensor module 402. The sensor module 402 may receive the sensor data from the sensors 404, 406, 410. According to aspects of the disclosure, the sensor module 402 may filter the data to remove noise, encode the data, decode the data, merge the data, extract frames, or perform other functions. In an alternate configuration, the map generator 408 may receive sensor data directly from the sensors 404, 406, 410.

As shown in FIG. 4, the map generating module 408 may be in communication with the planning module 424 and the locomotion module 426 to generate and operate the car 428 according to maps generated according to aspects of the present disclosure. As described herein, the map generating module 408 may fuse online terrain data and mapped terrain data to provide accurate and robust terrain maps for the car 428. According to one aspect, the map generating module 408 may obtain mapped terrain data using SLAM, for example. The map generating module may generate a terrain map including both previously mapped terrain data as well as live, online terrain data obtained by the on-board sensors 404, 406, 408. The map generating module 408 may further apply a grid over the mapped area surrounding the ego vehicle, and combine the values of the weighted mapped terrain data with the weighted online terrain data within each grid cell to produce a combined value of the data. The weighted value for the mapped terrain data may be lower closer to the car 428 (and within the range of the car's sensors 404, 406, 410 range) and higher farther away from the car 428 (and outside the range of the car's sensors 404, 406, 410 range). Additionally, the weighted value for the online terrain data may be higher closer to the car 428 (and within the range of the car's sensors 404, 406, 410 range) and lower farther away from the car 428 (and outside the range of the car's sensors 404, 406, 410 range). The resulting grid may be used to determine the terrain and generate a fused terrain map accordingly.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of generating a terrain map comprising:
   retrieving a first set of map data from a remote memory;
   retrieving a second set of map data from at least one online sensor of an agent;
   generating a terrain map from the first and second sets of map data;
   applying a grid overlaying the terrain map, the grid comprising a plurality of cells;
   weighting each of the plurality of cells with a first non-zero weight corresponding to the first set of map data and a second non-zero weight corresponding to the second set of map data, wherein the first non-zero weight increases as each cell increases in distance from the agent and the second non-zero weight increases as each cell decreases in distance from the agent;
   generating for each of the plurality of cells a combined value from the first and second non-zero weight; and
   generating a fused terrain map reflecting the combined value.

2. The method of claim 1 wherein the first set of map data comprises data extracted from an existing terrain map.

3. The method of claim 2 wherein the existing terrain map is generated using Simultaneous Localization and Mapping.

4. The method of claim 1 wherein the second set of data comprises substantially real-time data from the at least one sensor.

5. The method of claim 4 wherein the second set of data comprises a point cloud.

6. The method of claim 1 wherein the combined value comprises a weighted mean of the first weight and the second weight.

7. The method of claim 6 wherein the first weight and second weight sum to one.

8. The method of claim 1 wherein the combined value is filtered to reduce noise.

9. The method of claim 8 wherein the combined value is filtered using a Gaussian kernel.

10. The method of claim 1 wherein the at least one sensor is one of a LIDAR, a RADAR, a 2D camera, an RGB camera, and ultrasound.

11. A map generation device comprising:
    a memory storing a first set of map data obtained from a remote memory;
    an online sensor of an agent configured to obtain a second set of map data; and
    a map generating module comprising one or more processors, the map generating module configured to:
    generate a terrain map from the first and second sets of map data;
    apply a grid overlaying the terrain map, the grid comprising a plurality of cells;
    weight each of the plurality of cells with a first non-zero weight corresponding to the first set of map data and a second non-zero weight corresponding to the second set of map data, wherein the first non-zero weight increases as each cell increases in distance from the agent and the second non-zero weight increases as each cell decreases in distance from the agent;
    generate for each of the plurality of cells a combined value from the first and second non-zero weight; and
    generate a fused terrain map reflecting the combined value.

12. The map generation device of claim 11 wherein the first set of map data comprises data extracted from an existing terrain map.

13. The map generation device of claim 12 wherein the existing terrain map is generated using Simultaneous Localization and Mapping.

14. The map generation device of claim 11 wherein the second set of data comprises substantially real-time data from the at least one sensor.

15. The map generation device of claim 14 wherein the second set of data comprises a point cloud.

16. The map generation device of claim 11 wherein the combined value comprises a weighted mean of the first weight and the second weight.

17. The map generation device of claim 16 wherein the first weight and second weight sum to one.

18. The map generation device of claim 11 wherein the combined value is filtered to reduce noise.

19. The map generation device of claim 18 wherein the combined value is filtered using a Gaussian kernel.

20. The map generation device of claim 11 wherein the at least one sensor is one of a LIDAR, a RADAR, a 2D camera, an RGB camera, and ultrasound.

* * * * *